(No Model.)
R. B. WALKER.
DEVICE FOR CURING CHICKENS OF THE GAPES.
No. 343,145.            Patented June 1, 1886.
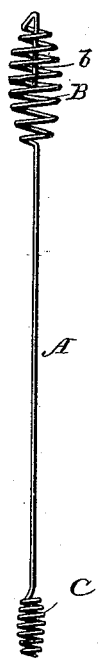
WITNESSES
G. S. Elliott
E. M. Johnson
Robert B Walker
INVENTOR
Attorney

UNITED STATES PATENT OFFICE.

ROBERT B. WALKER, OF NEW ANTIOCH, OHIO, ASSIGNOR TO ESTHER WALKER, OF SAME PLACE.

DEVICE FOR CURING CHICKENS OF THE GAPES.

SPECIFICATION forming part of Letters Patent No. 343,145, dated June 1, 1886.

Application filed January 21, 1886. Serial No. 189,348. (No model.)

*To all whom it may concern:*

Be it known that I, ROBERT B. WALKER, a citizen of the United States of America, residing at New Antioch, in the county of Clinton and State of Ohio, have invented certain new and useful Improvements in Devices for Curing Chickens of the Gapes; and I do hereby declare the following to be a full, clear, and exact description of the invention, such as will enable others skilled in the art to which it appertains to make and use the same, reference being had to the accompanying drawing, and to letters or figures of reference marked thereon, which forms a part of this specification.

My invention relates to an improved implement or device for removing worms or obstructions from the throats of poultry or chickens, and is especially adapted for removing therefrom worms in the treatment of gapes.

My invention consists of an implement which is made of fine or flexible wire, one end of the same being formed or bent spirally, while the other end is bent so as to form a handle, said implement being adapted to be inserted in the throat of the chicken and turned so as to disengage the worms therefrom and remove the same when withdrawn.

In the accompanying drawing, which illustrates my invention, the figure is a side view of my improved implement.

A represents a flexible wire, the end B thereof being formed into a spiral, while the terminal portion is bent back upon itself, so as to lie within the spirals, as shown at *b*. The opposite end, C, is also formed into a spiral or other shape, so as to form a convenient handle.

In treating young poultry for the disease hereinbefore mentioned, the end B is employed and the chick is held firmly in one hand while the implement is passed down into its throat, and while being passed down is slightly turned. After the implement has been inserted for a sufficient depth it is withdrawn with a sudden movement and will carry with it the worms or obstructions which may be in the throat.

Heretofore it has been common in treating poultry for the gapes to insert a horsehair or thin wire, which is bent upon itself; but this manner of treating is objectionable and is not always effective, and there is a liability of choking. With my improved implement there is no liability of choking, as the passage-way is kept open by the enlarged end, and the air may pass through the central opening between the spirals. The end *b* of the wire, being turned within the spiral of the wire, as shown, cannot come in contact with the membranes of the throat and injure the same. The end B is tapered adjacent to the shank, and the opposite end may be tapered, so as to be easily inserted.

I claim—

As an improved article of manufacture, an implement for removing obstructions from the throats of poultry, consisting of a body portion of flexible wire, one end of which is bent into a spiral, substantially as shown, and for the purpose set forth.

In testimony whereof I affix my signature in presence of two witnesses.

ROBERT B. WALKER.

Witnesses:
R. C. LAWHEAD,
WM. C. GREGORY.